United States Patent [19]

Nakamura

[11] Patent Number: 5,742,281
[45] Date of Patent: Apr. 21, 1998

[54] IMAGE CONTROL DEVICE

[75] Inventor: Katsutoshi Nakamura, Suwa, Japan

[73] Assignee: Seiko Epson Corp., Tokyo, Japan

[21] Appl. No.: 303,131

[22] Filed: Sep. 8, 1994

Related U.S. Application Data

[63] Continuation of Ser. No. 934,689, filed as PCT/JP92/0054, Jan. 23, 1992, published as WO92/13314, Aug. 6, 1992, abandoned.

[30] Foreign Application Priority Data

Jan. 23, 1991 [JP] Japan ................... 3-006249

[51] Int. Cl.$^6$ ........................................ G06F 15/64
[52] U.S. Cl. ........................... 345/191; 345/511
[58] Field of Search ........................ 345/185, 187, 345/200, 201, 89, 191; 395/518, 509, 510, 417, 405

[56] References Cited

U.S. PATENT DOCUMENTS

| | | |
|---|---|---|
| 4,037,209 | 7/1977 | Nakajima et al. . |
| 4,482,979 | 11/1984 | May ............................ 345/185 |
| 4,604,615 | 8/1986 | Funahashi ..................... 345/185 |
| 4,609,917 | 9/1986 | Shen . |
| 4,628,305 | 12/1986 | Ikeda . |
| 4,634,970 | 1/1987 | Payne et al. .................. 345/185 |
| 4,818,979 | 4/1989 | Manson ........................ 345/185 |
| 5,349,372 | 9/1994 | Sellers ......................... 345/185 |

FOREIGN PATENT DOCUMENTS

| | | |
|---|---|---|
| 1-111278 | of 0000 | Japan . |
| 2-250183 | of 0000 | Japan . |
| 59-55556 | of 0000 | Japan . |

*Primary Examiner*—Mark R. Powell
*Attorney, Agent, or Firm*—Loeb & Loeb LLP

[57] ABSTRACT

According to the image control device of this invention, when the data lines of the VRAMs (105 to 108) are matched with the data lines of the CPU, the bus converting circuits (101 to 104, 150) are provided between the CPU and the VRAMs (105 to 108) and between the VRAMs (105 to 108) and the display system respectively, at least two independent frames are constructed by at least two VRAMs (105 to 108), and the independence thereof is kept through address control of the bus converting circuits (101 to 104, 150) and the VRAMs (105 to 108), so that the simultaneous multi-bit access from the drawing device (100) can be performed.

4 Claims, 19 Drawing Sheets

| | Plain 0 | Plain 1 | Plain 2 | Plain 3 | Plain 4 | Plain 5 | Plain 6 | Plain 7 |
|---|---|---|---|---|---|---|---|---|
| RAM450 | X0 | X1 | X2 | X3 | X4 | X5 | X6 | X7 |
| RAM451 | X1 | X0 | X3 | X2 | X5 | X4 | X7 | X6 |
| RAM452 | X2 | X3 | X0 | X1 | X6 | X7 | X4 | X5 |
| RAM453 | X3 | X2 | X1 | X0 | X7 | X6 | X5 | X4 |
| RAM454 | X4 | X5 | X6 | X7 | X0 | X1 | X2 | X3 |
| RAM455 | X5 | X4 | X7 | X6 | X1 | X0 | X3 | X2 |
| RAM456 | X6 | X7 | X4 | X5 | X2 | X3 | X0 | X1 |
| RAM457 | X7 | X6 | X5 | X4 | X3 | X2 | X1 | X0 |

Fig.2

VRAM-105

| A0,A1,A2,A3 | b4,b5,b6,b7 | c8,c9,cA,cB | dC,dD,dE,dF | ・・・・・・ |

VRAM-106

| b0,b1,b2,b3 | A4,A5,A6,A7 | d8,d9,dA,dB | cC,cD,cE,cF | ・・・・・・ |

VRAM-107

| c0,c1,c2,c3 | d4,d5,d6,d7 | A8,A9,AA,AB | bC,bD,bE,bF | ・・・・・・ |

VRAM-108

| d0,d1,d2,d3 | c4,c5,c6,c7 | b8,b9,bA,bB | AC,AD,AE,AF | ・・・・・・ |

ADDRESS　'00'　　'01'　　'10'　　'11'

Fig.4

| | | | | |
|---|---|---|---|---|
| (a) | A0.A1.A2.A3. | b4.b5.b6.b7. | c8.c9.cA.cB. | dC.dD.dE.dF. ··· |
| (b) | b0.b1.b2.b3. | A4.A5.A6.A7. | d8.d9.dA.dB. | cC.cD.cE.cF. ··· |
| (c) | c0.c1.c2.c3. | d4.d5.d6.d7. | A8.A9.AA.AB. | bC.bD.bE.bF. ··· |
| (d) | d0.d1.d2.d3. | c4.c5.c6.c7. | b8.b9.bA.bB. | AC.AD.AE.AF. ··· |

(e)

(f)

| | | | | |
|---|---|---|---|---|
| (g) | A0.A1.A2.A3. | A4.A5.A6.A7. | A8.A9.AA.AB. | AC.AD.AE.AF. ··· |
| (h) | b0.b1.b2.b3. | b4.b5.b6.b7. | b8.b9.bA.bB. | bC.bD.bE.bF. ··· |
| (i) | c0.c1.c2.c3. | c4.c5.c6.c7. | c8.c9.cA.cB. | cC.cD.cE.cF. ··· |
| (j) | d0.d1.d2.d3. | d4.d5.d6.d7. | d8.d9.dA.dB. | dC.dD.dE.dF. ··· |

Time  T0 T1 T2 T3  T4 T5 T6 T7  T8 T9 T10 T11  T12 T13 T14 T15

Fig.7

|        | Plain 0 | Plain 1 | Plain 2 | Plain 3 | Plain 4 | Plain 5 | Plain 6 | Plain 7 |
|--------|---------|---------|---------|---------|---------|---------|---------|---------|
| RAM450 | X0 | X1 | X2 | X3 | X4 | X5 | X6 | X7 |
| RAM451 | X1 | X0 | X3 | X2 | X5 | X4 | X7 | X6 |
| RAM452 | X2 | X3 | X0 | X1 | X6 | X7 | X4 | X5 |
| RAM453 | X3 | X2 | X1 | X0 | X7 | X6 | X5 | X4 |
| RAM454 | X4 | X5 | X6 | X7 | X0 | X1 | X2 | X3 |
| RAM455 | X5 | X4 | X7 | X6 | X1 | X0 | X3 | X2 |
| RAM456 | X6 | X7 | X4 | X5 | X2 | X3 | X0 | X1 |
| RAM457 | X7 | X6 | X5 | X4 | X3 | X2 | X1 | X0 |

5,742,281

1

IMAGE CONTROL DEVICE

This is a continuation of application Ser. No. 07/934,689 filed on Sep. 23, 1992, now abandoned.

FIELD OF TECHNOLOGY

This invention relates to application of a construction system of an image control device for use in a computer, and particularly to a device applicable to a case where it is required for an image drawing portion (hereinafter referred to as "drawing portion") such as a central processing unit (CPU) or an exclusively-used image drawing processor, a DMA control device or the like to carry out an access operation at plural times when the number of input/output terminals of a dynamic RAM (D-RAM) used as an image storing element or a dual port video RAM (hereinafter referred to as "VRAM") is smaller than a data processing unit of the drawing portion.

DESCRIPTION OF RELATED ART

A bit map display having display resolution of 512×512 (which is an image display device having a one-bit storing element at each picture element and is called as a graphic display; hereinafter referred to as "image control device") is required to have image storing capacity of 256 K-bits at minimum. When a general 256 K-bit VRAM is used, information of one frame (hereinafter referred to as "plane") can be stored in one element of VRAM, and an image data can be output to an image display device or the like at high speed without modification by a built-in serial output terminal. The 256 K-bit VRAM is equipped with a 4-bit input/output data terminal, and thus the drawing portion can simultaneously access four bits.

FIG. 17 shows a general image control device which is constructed by a drawing portion having a 4-bit data bus and four 256-Kbit VRAMs. The 4-bit data bus which is connected to the drawing portion 500 is connected to VRAMs 501 to 504 each constituting a plane. Serial output signals 511 to 514 of the VRAMs are directly output to a display portion.

When 8-bit data A0 to A7 are written in the head address of a plane "0" by the drawing portion 500, twice access operations in which the data A0 to A3 are first written in an address "0" of the plane "0" and then the data A4 to A7 are written in an address "1" at a next cycle in the same manner are required because the data processing unit of the drawing portion 500 is 4-bit.

The data A0 to A7 in the VRAM are successively output from the output terminal 511 in synchronism with an frame control signal in order of A0, A1, A2 to A7 for a frame display. This operation is conducted on the VRAMs 502 to 504 of the other planes which are originally independently provided.

FIGS. 18 and 19 show conventional devices whose drawing portions have 8-bit data processing unit. In the conventional device as shown in FIG. 18, the capacity of one plane is set to 256 K-bits like that of FIG. 17, and the processing unit of a drawing portion 600 is also set to 8-bit. However, since the drawing portion 600 has the 8-bit data processing unit, an auxiliary circuit 607 including a 4-bit latch circuit 605 and a selection circuit 606 is required between a 8-bit data bus 610 extending from the drawing portion 600 and a 4-bit data bus 611 which is connected to each of planes 601 to 604.

High-order four bits of a 8-bit data which is output from the drawing portion 600 are temporally held in the latch

2 circuit 605 while only the remaining low-order four bits are directly transmitted through the selection circuit 606 to the planes 601 to 604. Thereafter, the high-order four bits which have been held are transmitted.

This indicates that the auxiliary circuit carries out the transmission operation twice while the drawing portion 600 carries out the transmission operation once, so that no improvement is performed for the access system to a plane. In addition, when the drawing portion has a 16-bit data bus width, the temporally-storing latch is used for 12 bits, so that the access number is increased to four.

FIG. 19 shows a frequently-used conventional system in which the capacity of one plane is set to two times of an originally-required capacity. Each of planes 701 to 704 has two 256 K-bit VRAMs to enable direct connection to the 8-bit data bus. In this case, there occurs no problem in the access number as described above, but an originally-unnecessary capacity must be provided, so that cost of the device is necessarily increased. In a case where the bit width of the drawing portion is set to 16 bits, if the same system is applied to this case, the total memory capacity is increased to four times, and further it is increased to eight times for 32-bit width.

The CPU, serving as a central unit for the drawing portion though it is a compact image control device, has been improved in its performance by replacing 8-bit to 16-bit or 32 bit. Further, the 256 K-bits VRAM has been also improved in its packaging density through replacement to a 1-Mbits VRAM (256K×4 and 128K×8 are mainly used). That is, it is no exaggeration to say that the bit width of the drawing portion trends to be enlarged and the data width of the VRAM constituting the storing portion trends to be reduced. Every time performance and packaging density are intended to be improved, inconsistent matters conflicting to the intention of improvement appear. Fortunately, makers for supplying a VRAM have made an effort to achieve a multiple-bit performance when a next-generation VRAM is developed. Therefore, in order to supply an image control device having low price and high performance, there is a problem to supply an image control device capable of performing a high-speed access without changing the total capacity of the image memory even when the data bus width of the CPU is enlarged two times or four times.

DISCLOSURE OF THE INVENTION

This invention has an object to solve the above problem in the image control device.

According to the image control device of this invention, first and second data bus converting circuits are provided at front and rear stages of a VRAM respectively to keep independence between planes, and thus the data terminal of the VRAM can be effectively used. Therefore, there can be provided a device in which the total memory capacity of the image storing portion is unvaried and the access number is also unvaried even when the data bus width of the drawing portion is increased by two or more times.

Concretely, the image control device according to this invention includes an image drawing portion, an image storing portion and an image display portion. The image drawing portion processes a first data processing unit, and serves to access any one of frames from the image storing portion having a memory structure of plural frames. The image storing portion processes a second data processing unit which is defined by an arrangement of memory elements constituting a frame. The first data bus converting circuit is provided between the image drawing portion and the image storing portion, and the second data bus converting circuit is provided between the image storing portion and the image display portion.

In addition, address control means for the storing elements is provided to simultaneously perform processings from the image drawing portion to the image storing portion even when the first and second data processing units are different from each other.

Further, the image control device according to this invention is equipped with a first data bus converting circuit for dividing the image data of the first data processing unit output from the image drawing portion every second data processing unit and assigning the respective divided data to plural image storing portions in parallel, and a second data bus converting circuit for reading out each of the divided data stored in the plural image storing portions to edit the read-out data to the image data before they are divided in the first data bus converting circuit and outputting the edited data to the image display portion. The image control device is further equipped with address control means for storing the data divided in the first data bus converting circuit into each of the image storing portions.

BRIEF DESCRIPTION OF THE DRAWINGS

FIG. 2 shows memory charts of VRAMs;

FIG. 4 is a time chart for an operation of an embodiment of this invention;

FIG. 7 is a diagram showing the relationship between each plane and each RAM;

PREFERRED EMBODIMENTS FOR THIS INVENTION

Figure 1:
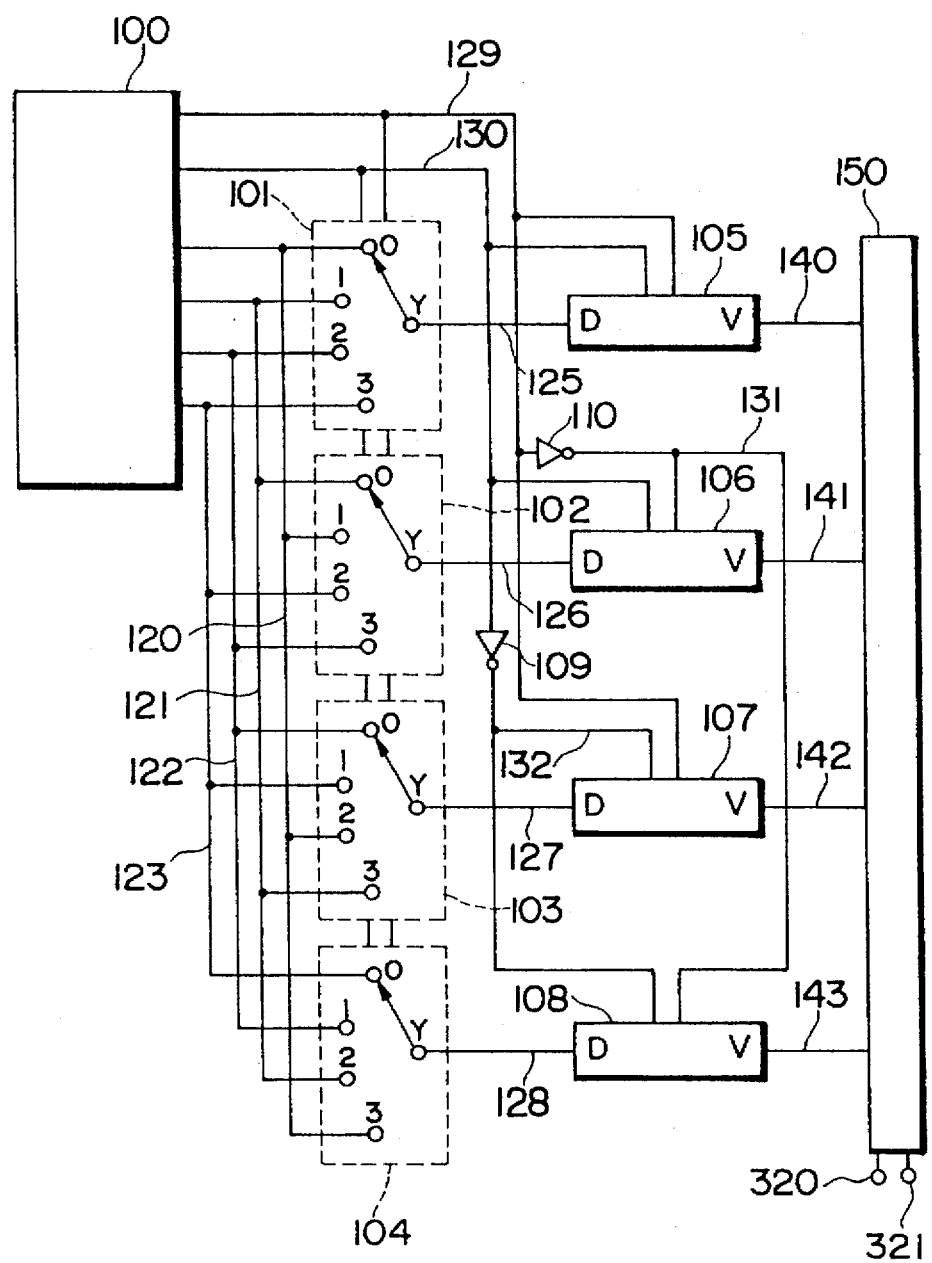
FIG. 1 is a schematic diagram showing the construction of a first bus converting circuit and peripheral circuits thereof.

FIG. 1 shows an embodiment of this invention, and the function of a device is expanded by replacing a conventional 4-bit drawing portion to a 16-bit drawing portion.

The drawing portion 100 is operated with 16 bits, and has four 4-bit data buses 120 to 123. Each of planes 105 to 108 comprises a single 256 K-bit VRAM, and the total memory capacity thereof is equal to the capacity required to obtain display resolution.

A first data processing unit according to claims comprises an assembly of 16 bits which serves as a data processing unit of the drawing portion, and a second processing unit comprises an assembly of 4 bits whose number is equal to the number of data terminals. Therefore, the first processing unit is different from the second processing unit. The data buses 120 to 123 extending from the drawing portion 100 are connected to first data bus converting circuits 101 to 104, and data buses 125 to 128 extending from the data bus converting circuits 101 to 104 are connected to VRAMs 105 to 108 each serving as a plane, respectively. One-bit serial video data buses 140 to 143 output from the respective VRAMs are transmitted through the second data bus converting circuit 150 (as shown in detail in FIG. 3) to the display portion.

The data buses 120 to 123 are constructed by four buses each having four bits as an unit. An image data of 16 bits which serves as a data processing unit of the drawing portion 100 is divided into 4-bit units, and the 4-bit units thus divided are provided with data buses 120, 121, 122 and 123 in order from the highest order.

The data bus converting circuits 101 to 104 are connected to common-control lines 129 and 130. In this embodiment, both of selection signals to be supplied to the control lines 129 and 130 are set to "0". The data bus 125 is connected to the highest-order data bus 120, and the subsequent data buses 126, 127 and 128 are connected to the data bus 121, the data bus 122 and the data bus 123, respectively.

The control lines 129 and 130 are used as the low-order two bits for an address line of each of the VRAMs 105 to 108. However, each lowest-order address of the VRAMs 106 and 108 is connected to a control line 131 which is connected through an inversion element 110 to the control line 129, and a next lowest-order address of each of the VRAMs 107 and 108 is connected to a control line 132 which is connected through an inversion element 109 to the control line 130. Therefore, in this embodiment, the lowest-order two bits of the addresses of the VRAMs 105, 106, 107 and 108 are specified to be in "00", "01", "10" and "11" states, respectively.

FIG. 2 shows a memory content of each VRAM. When "0" and "0" are first specified to signals 129 and 130 respectively and then 16-bit data "A0 to AF" is simultaneously written in the head of each VRAM, 4-bit data "A0 to A3" is written in the address "00" of the VRAM 105, 4-bit data "A4 to A7" is written in the address "01" of the VRAM 106, 4-bit data "A8 to AB" is written in the address "10" of the VRAM 107, and 4-bit data "AC to AF" is written in the address "11" of the VRAM 108.

Next, when "1" and "0" are specified to the signals 129 and 130 respectively and 16-bit data "b0 to bF" is written in, 4-bit data "b4 to b7" is written in the address "01" of the VRAM 105, 4-bit data "b0 to b3" is written in the address "00" of the VRAM 106, 4-bit data "bC to bF" is written in the address "11" of the VRAM 107 and 4-bit data "b8 to bB" is written in the address "10" of the VRAM 108.

Further, when "0" and "1" are specified to the signals 129 and 130 respectively and 16-bit data "c0 to cF" are written in, 4-bit data "c8 to cB" is written in the address "10" of the VRAM 105, 4-bit data "cC to cF" is written in the address "11" of the VRAM 106, 4-bit data "c0 to c3" is written in the address "00" of the VRAM 107 and 4-bit data "c4 to c7" is written in the address "01" of the VRAM 108.

Still further, when "1" and "1" are specified to the signals 129 and 130 respectively and 16-bit data "d0 to dF" are written in, 4-bit data "dC to dF" is written in the address "11" of the VRAM 105, 4-bit data "d8 to dB" is written in the address "10" of the VRAM 106, 4-bit data "d4 to d7" is written in the address "01" of the VRAM 107 and 4-bit data "d0 to d3" is written in the address "00" of the VRAM 108.

It is clearly found out from this operation that at least 16 bits can be simultaneously written in or read out by one access operation to the drawing portion.

FIG. 2 means a pattern in which the contents of the VRAMs 105 to 108 are sequentially output to the serial video data buses 140 to 143.

Figure 3:
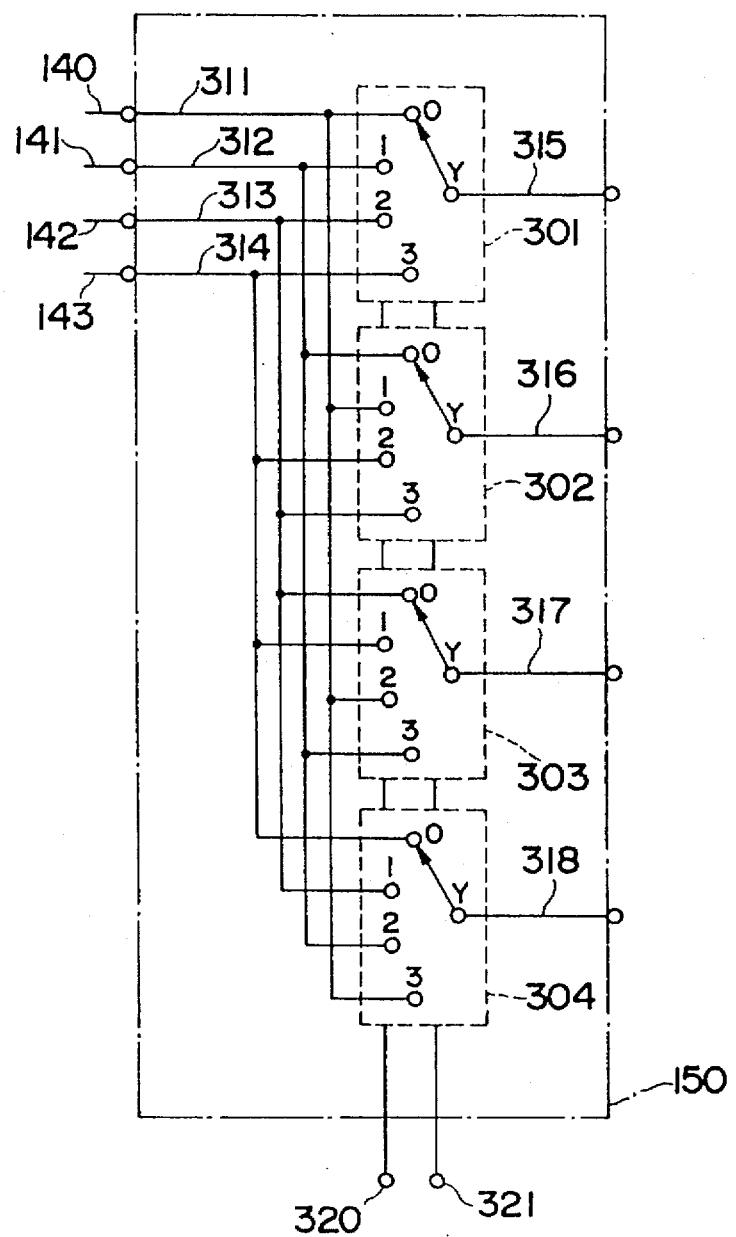
FIG. 3 is a schematic diagram showing the construction of a second bus converting circuit.

FIG. 3 is a detailed diagram of the second bus converting circuit 150 as shown in FIG. 1.

Data buses 311 to 314 serving as four inputs of the second bus converting circuit 150 are connected to selection circuits 301 to 304 to select any one of the data buses 311 to 314, and an output signal thereof is supplied to data buses 315 to 318. In addition, control lines 320 and 321 are commonly input to the selection circuits 301 to 304 so that a point of each circuit is selected. In this embodiment, both signals are set to "0".

FIGS. 4(a) to 4(j) show time charts at the output side of this embodiment. FIGS. 4(a) to 4(d) are signal diagrams for a serial video data output in accordance with a memory map as shown in FIG. 2, and show waveforms of input signals supplied to the data buses 311 to 314. Further, FIGS. 4(e) and (f) show waveforms of selection signals supplied to the control lines 320 and 321, and FIGS. 4(g) to 4(j) show waveforms of output signals to be supplied to the terminals 315 to 318.

Since both of the selection signals supplied to the control lines 320 and 321 are kept to "0" during a period from T0 to T3 (FIGS. 4(e), (f)), the data bus 315 is connected to the data bus 311, the data bus 316 is connected to the data bus 312, the data bus 317 is connected to the data bus 313, and the data bus 318 is connected to the data bus 314.

During a period from T4 to T7, the selection signal supplied to the control line 320 is kept to "1", and the selection circuits 301 to 304 are switched so that all of them select "1". Therefore, the data bus 315 is connected to the data bus 312, the data bus 316 is connected to the data bus 311, the data bus 317 is connected to the data bus 314, and the data bus 318 is connected to the data bus 313. Subsequently, the selection circuits are successively switched between a period from T8 to T11 and a period from T12 to T15 to finally obtain A0 to AF, b0 to bF, c0 to cF and d0 to dF which are simultaneously written in by the drawing portion.

The above embodiment is described particularly in a case where the drawing portion is constructed with 16 bits and the plane is constructed with 4 bits. The capacity of the VRAM is set to the minimally required capacity, and in addition the drawing portion can access 16-bit data at one normal cycle, so that the access operation at plural times as described in the conventional device is not required.

When the drawing portion is constructed with 8 bits, it can be constructed with simple construction using the bus converting circuits provided at the front and rear stages.

When the drawing portion is constructed with 32 bits, the conventional system is partly used in combination. However, the display device of this class is improved in its multiple-plane performance and high-resolution, so that the number of the used VRAMs is increased to some extent. Therefore, the data line number which can be simultaneously accessed is also increased, and thus there are many cases where only this embodiment is sufficient.

Next, a modification of the above embodiment in which the drawing portion is constructed with eight 32-bit RAMs each having 4-bit data terminal number will be described with reference to FIGS. 5 to 16.

Figure 5:
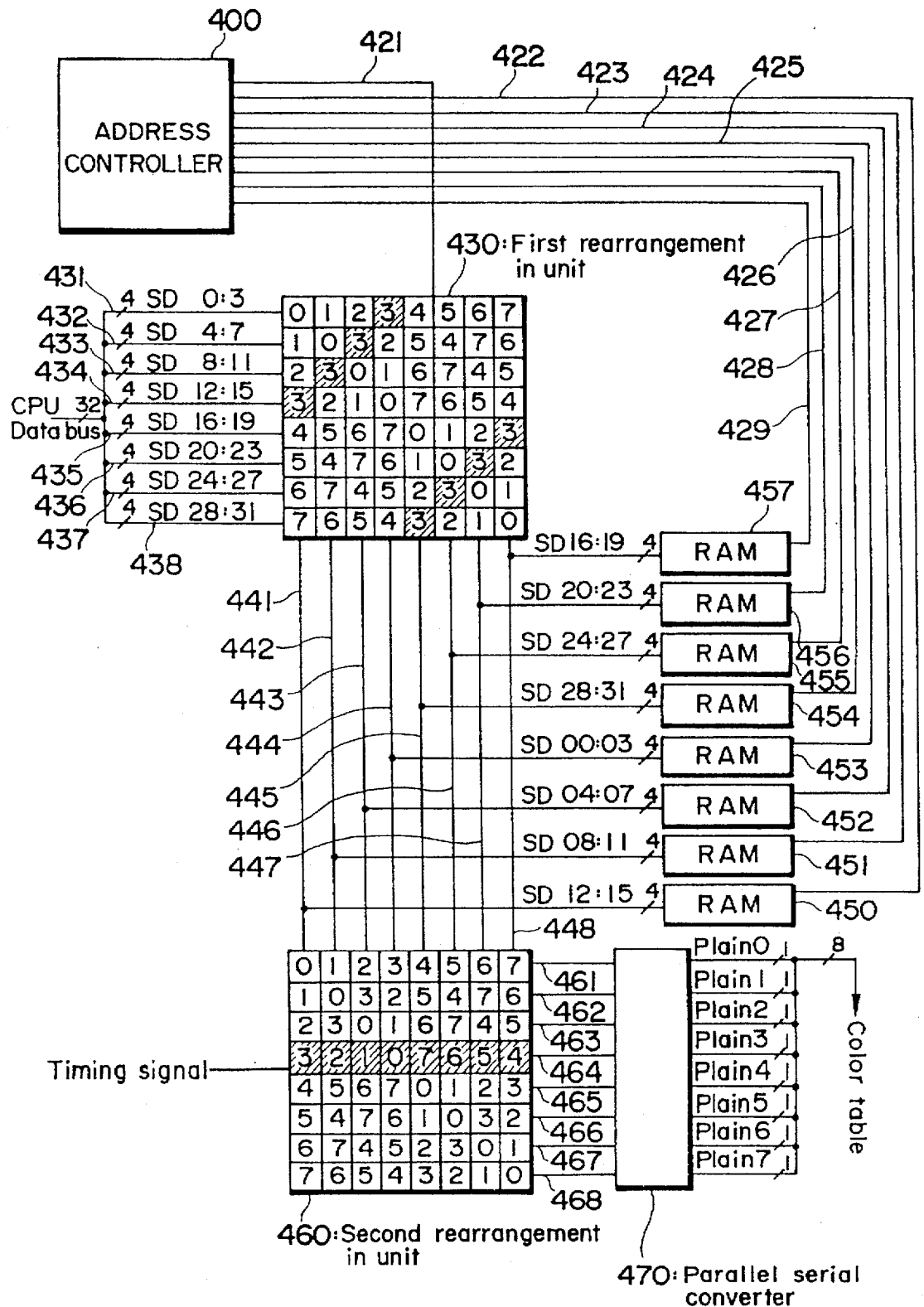
FIG. 5 is a block diagram of an example to which this embodiment is applied.
Figure 6:
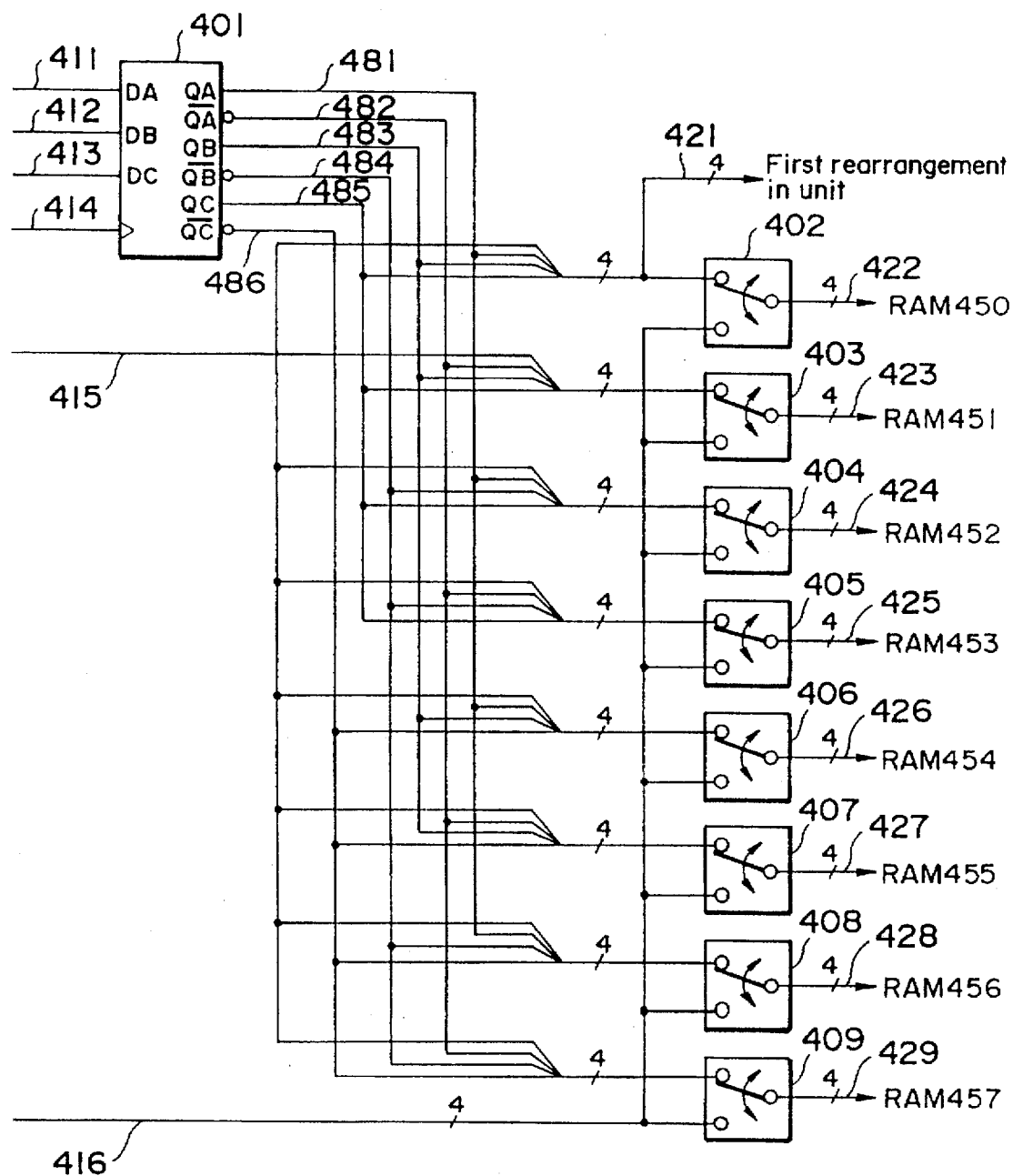
FIG. 6 is a block diagram for an address control circuit.

FIG. 5 is a block diagram showing the construction of this modified embodiment. In FIG. 5, the image control device comprises an address control circuit 400, a first rearrangement circuit 430, RAMs 450 to 457 each constituting a plane, a second rearrangement circuit 460 and a parallel/serial converter 470. A 32-bit image data transmitted from the CPU data bus is divided into 4-bit units, and then input to the first rearrangement circuit 430. The first rearrangement circuit 430 has an arrangement structure as shown in the figure, and is supplied with a plane signal from a signal line 421 of the control circuit 400 to rearrange the image data. The arrangement structure of the first rearrangement circuit 430 visually represents a connection state between 4-bit input data buses 431 to 438 and 4-bit output data buses 441 to 448, and actually it is constructed by plural logical circuits. Here, the input data buses 431 to 438 and the output data buses 441 to 448 are designed so as to be connected to one another at positions (oblique portions) "3" of the first rearrangement circuit 430 when the plane signal from the signal line 421 is a plane 3.

That is, the input data bus 431 is connected to the output data bus 444, the input data bus 432 is connected to the output data bus 443, the input data bus 433 is connected to the output data bus 442, and the input data bus 434 is connected to the output data bus 441. Also, the input data bus 435 is connected to the output data bus 448, the input data bus 436 is connected to the output data bus 447, the input data bus 437 is connected to the output data bus 446, and the input data bus 438 is connected to the output data bus 445. The image data of the 4-bit units are rearranged so as to be connected as described above, and these are simultaneously written in addresses indicated by the address control circuit, into RAM 450-457.

Thereafter, the image data stored in each of the RAMs 450 to 457 is read out and transmitted through the second rearrangement circuit 460 and the parallel/serial circuit 470 to a color table of a display portion.

The second rearrangement circuit 460 switches the connection between the output data buses 441 to 448 and the data buses 461 to 468 in accordance with times (T0 to T7) which are defined by a timing signal. That is, when the timing signal is set at the time T0, these buses are connected to one another so as to be intersected to one another at the positions "0" of the second rearrangement circuit 460. Likewise, every time the timing signal is switched at any one of the times T1 to T7, the connection between the output data buses 441 to 448 and the data buses 461 to 468 is successively switched.

Through this rearrangement operation, the image data of the plane 3 which are dispersively stored in the RAMs 450 to 457 are output from the data bus 464.

This is because the connection between the data bus 464 and the output data buses 441 to 448 is varied with time in order of the numbers of the oblique portions of the second rearrangement circuit 460. Concretely, the output data bus 444 is connected at the time T0, the output data bus 443 is connected at the time T1, and the similar connecting operation is carried out for the other output data buses at the time T3 and the subsequent times. Through this operation, the image data of the plane 0 and the image data of the plane 2 are output from the data bus 461 and the data bus 462, respectively. Likewise, the image data of the planes 3 to 8 are output from the data buses 463 to 468, respectively. The image data of the respective planes are output in parallel, so that all data are supplied to the color table during a period from the time T0 to the time T7.

The feature of this embodiment resides in that the image data from the 32-bit CPU data bus is divided into 4-bit units, and the divided 4-bit units are parallel written in or read out of the RAMs 450 to 457 each having 4-bit access unit.

In such a processing, it is possible that the write-in or read-out operation to a 32-bit plane is apparently carried out with an access unit by cooperating the address control circuit 400, the first rearrangement circuit 430 and the second rearrangement circuit 460.

In this modified embodiment, the circuit may be constructed by four RAMs each having 8-bit access unit.

Figure 8:
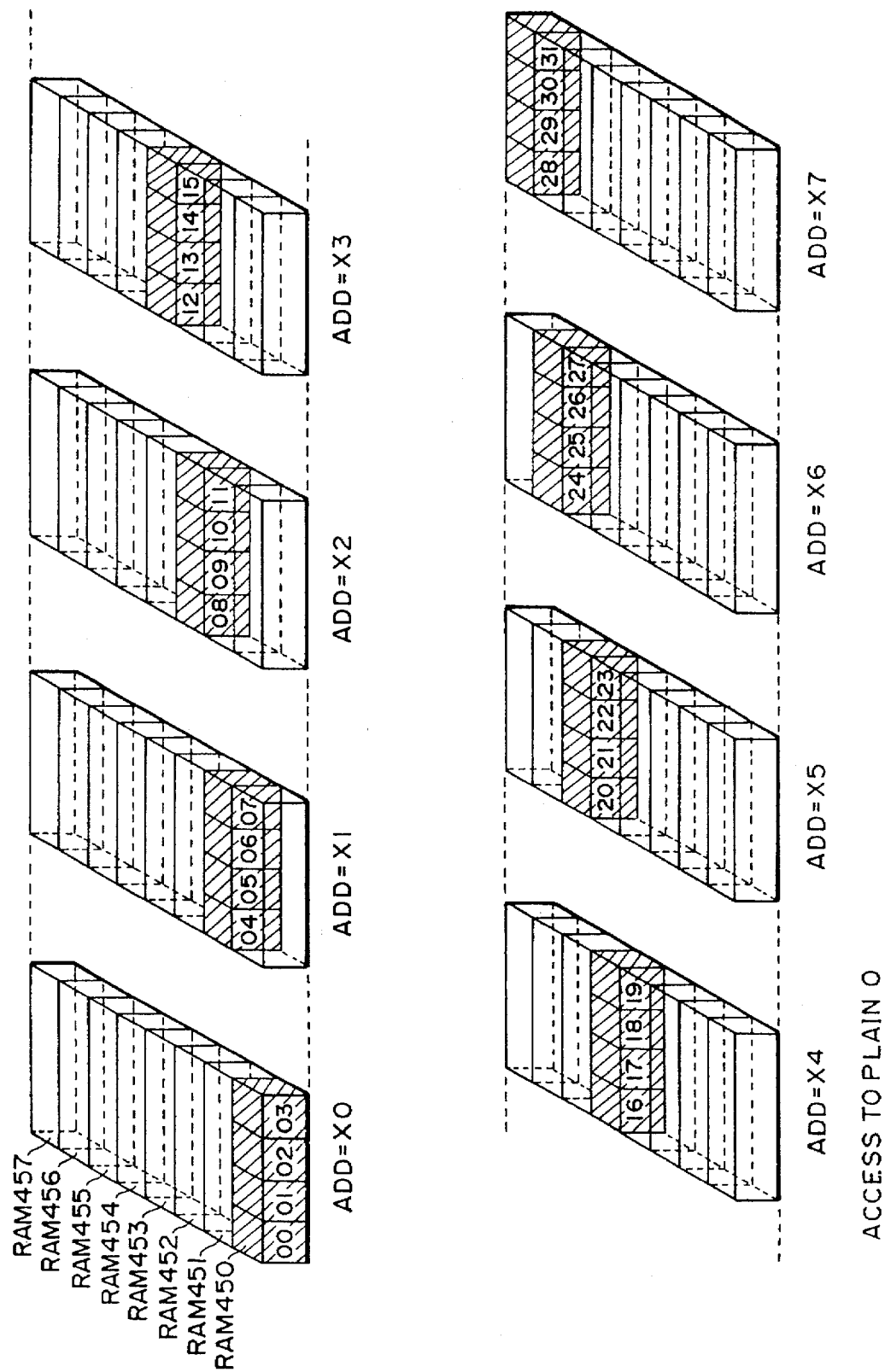
FIG. 8 is a schematic diagram showing an image data to be written in each RAM.
Figure 9:
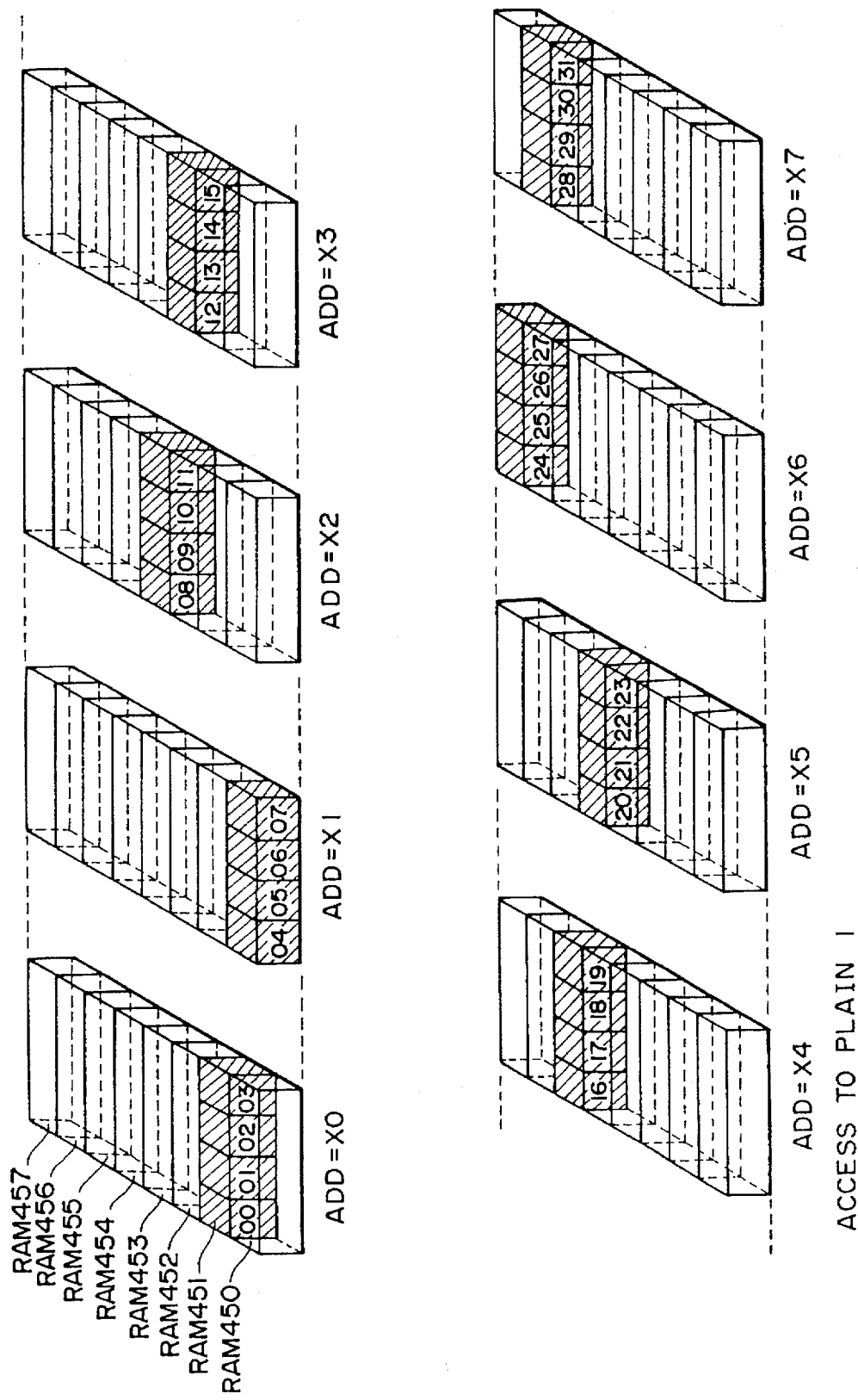
FIG. 9 is a schematic diagram showing the construction of an image data to be written in each RAM.
Figure 10:
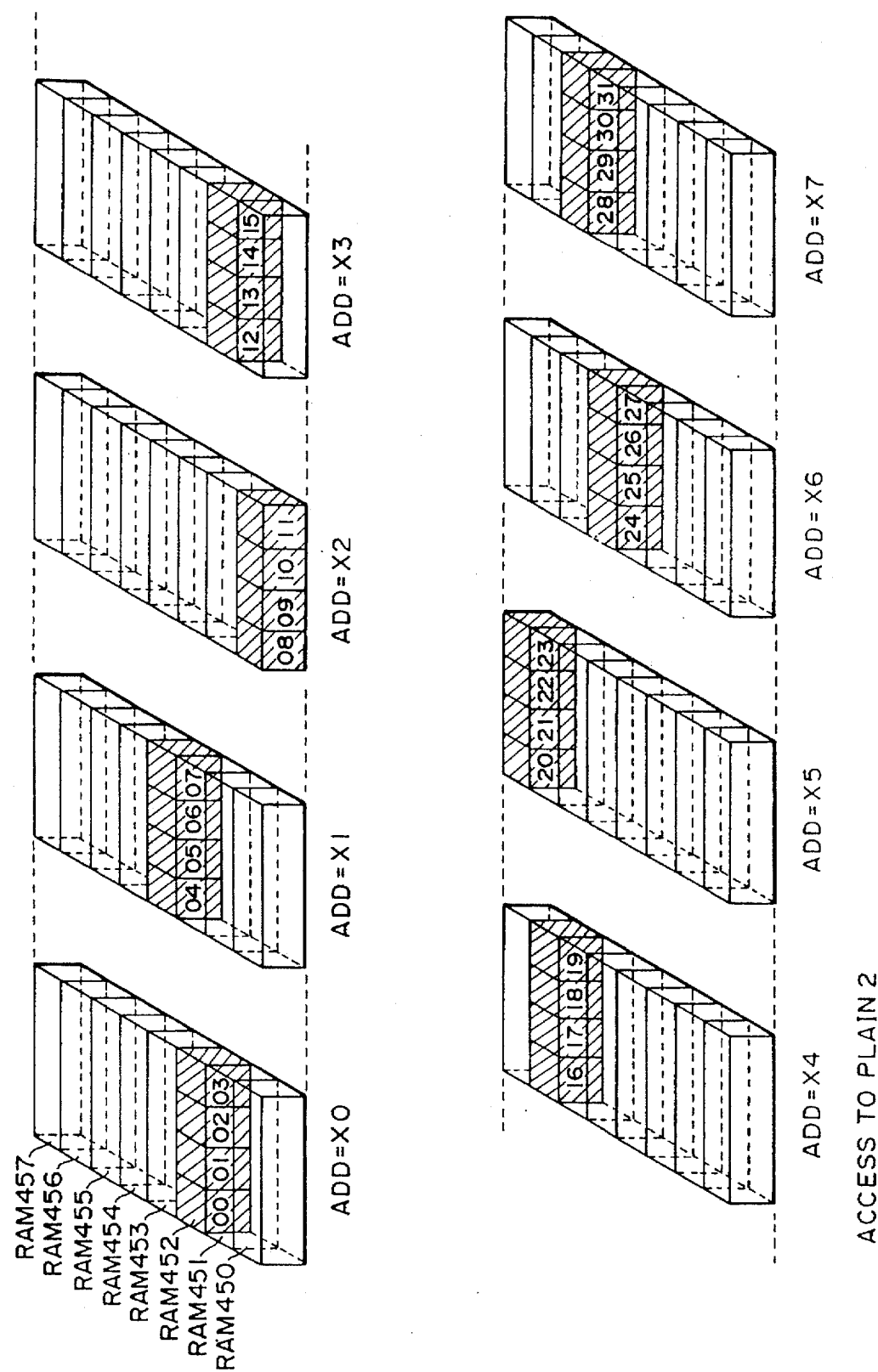
FIG. 10 is a schematic diagram showing the construction of an image data to be written in each RAM.
Figure 11:
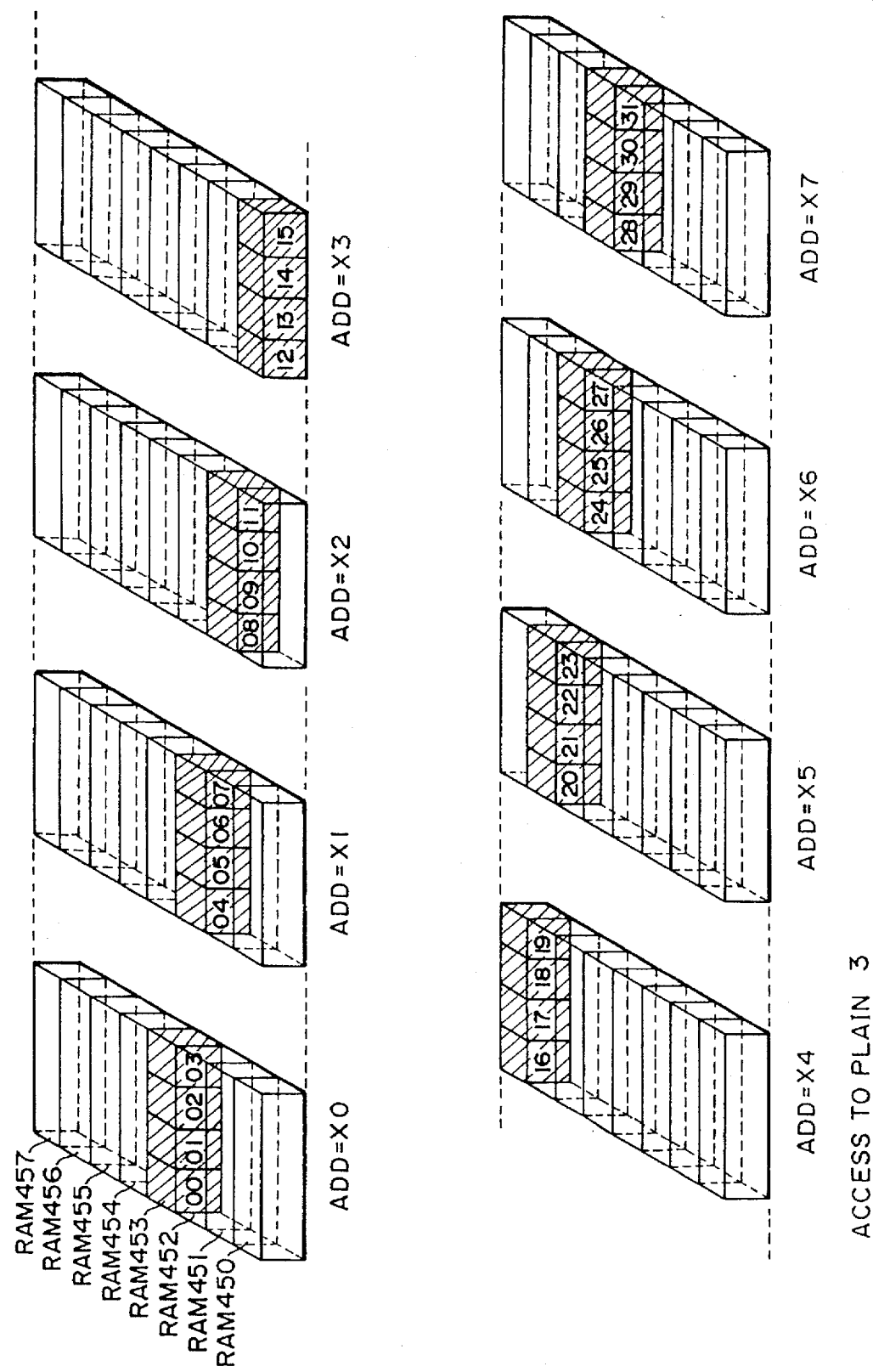
FIG. 11 is a schematic diagram showing the construction of an image data to be written in each RAM.
Figure 12:
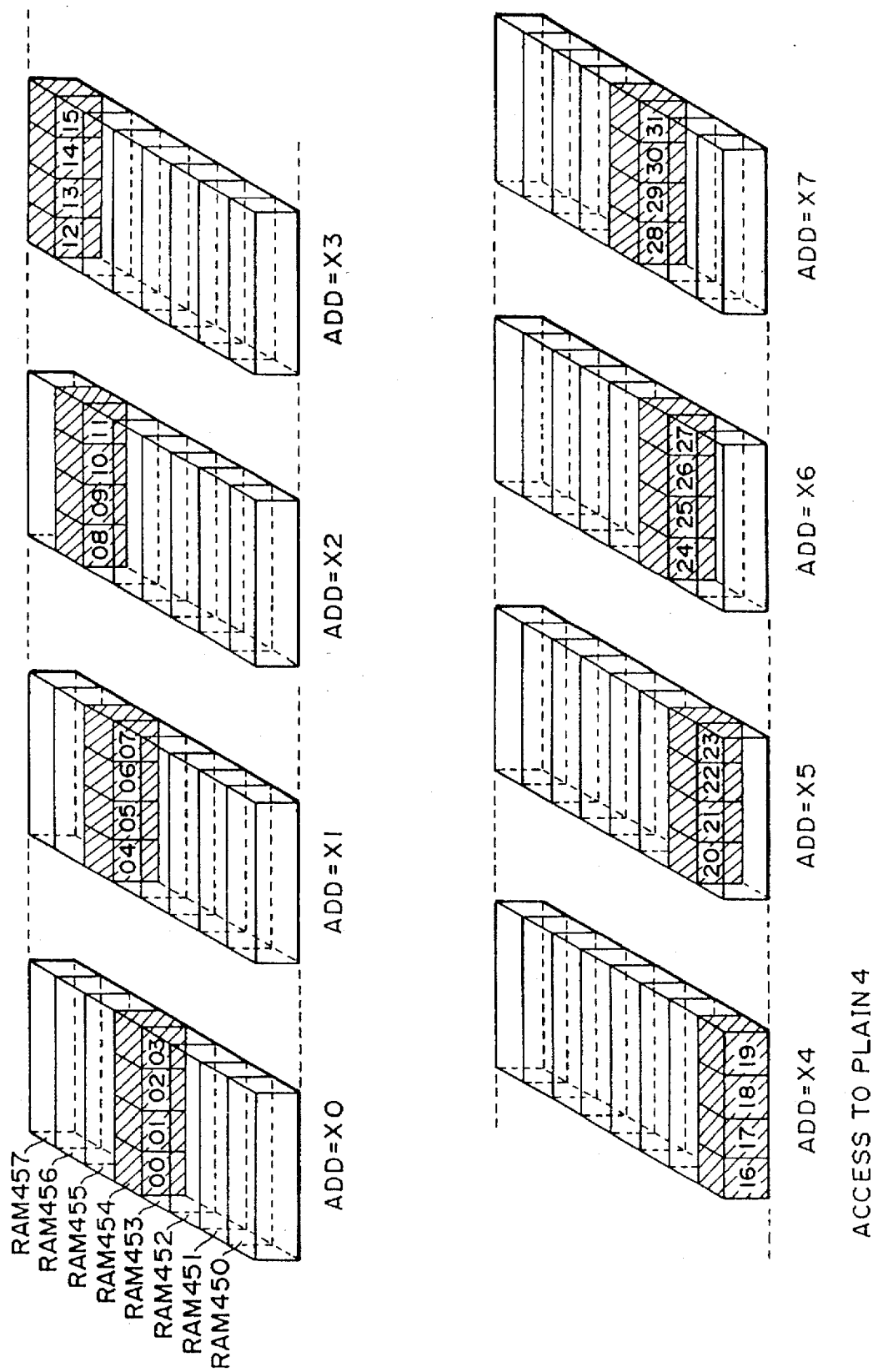
FIG. 12 is a schematic diagram showing the construction of an image data to be written in each RAM.
Figure 13:
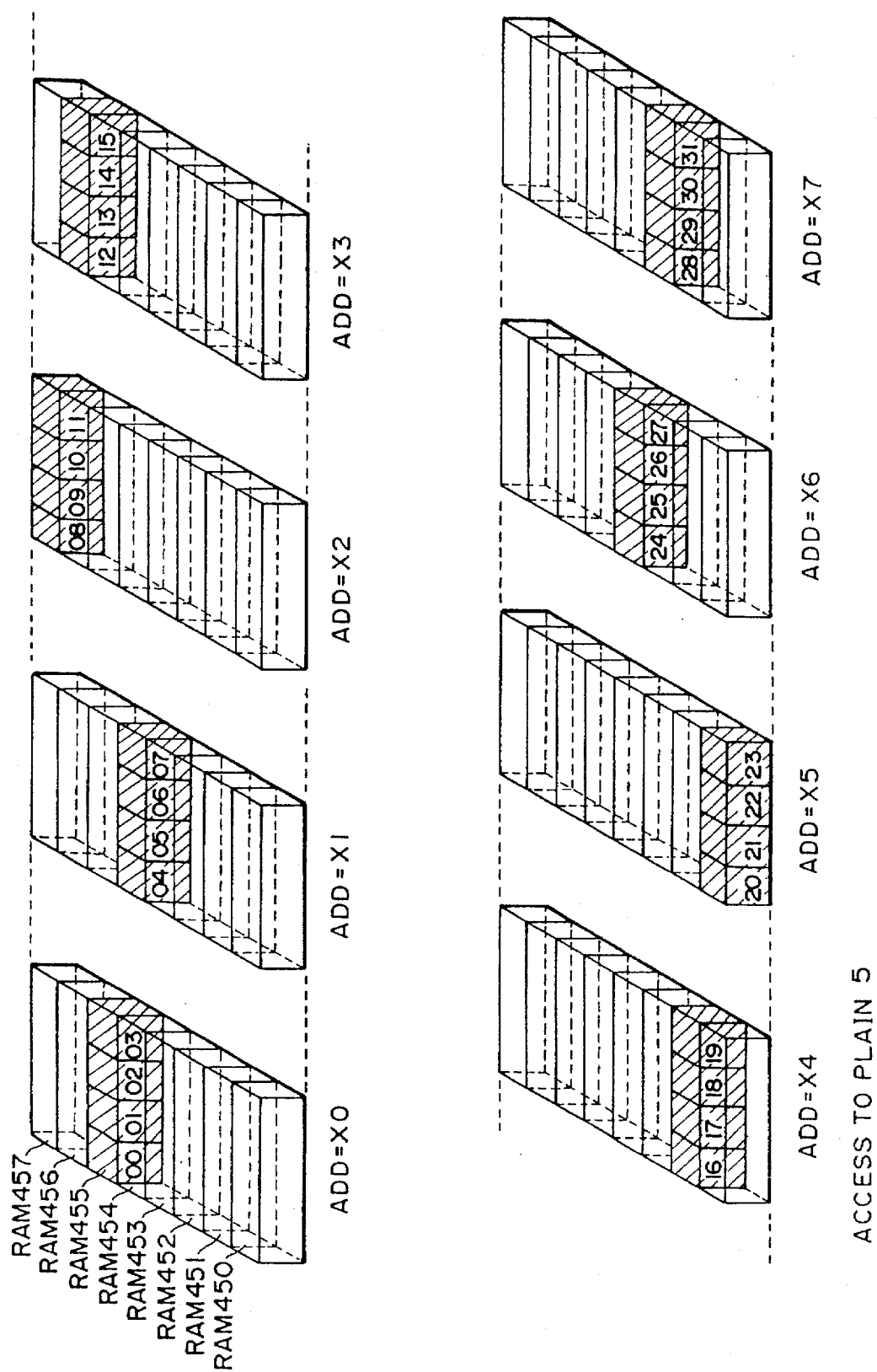
FIG. 13 is a schematic diagram showing the construction of an image data to be written in each RAM.
Figure 14:
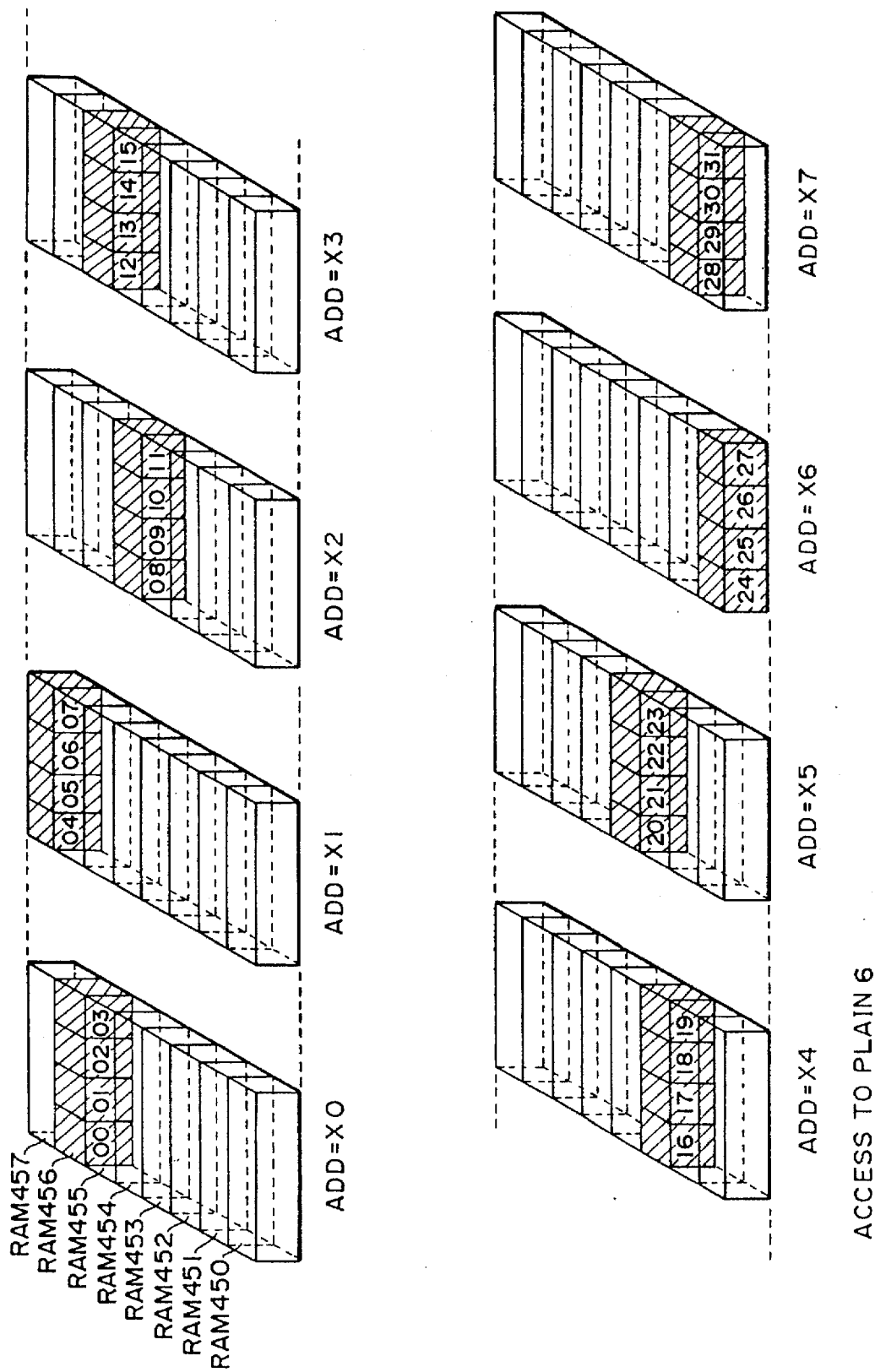
FIG. 14 is a schematic diagram showing the construction of an image data to be written in each RAM.
Figure 15:
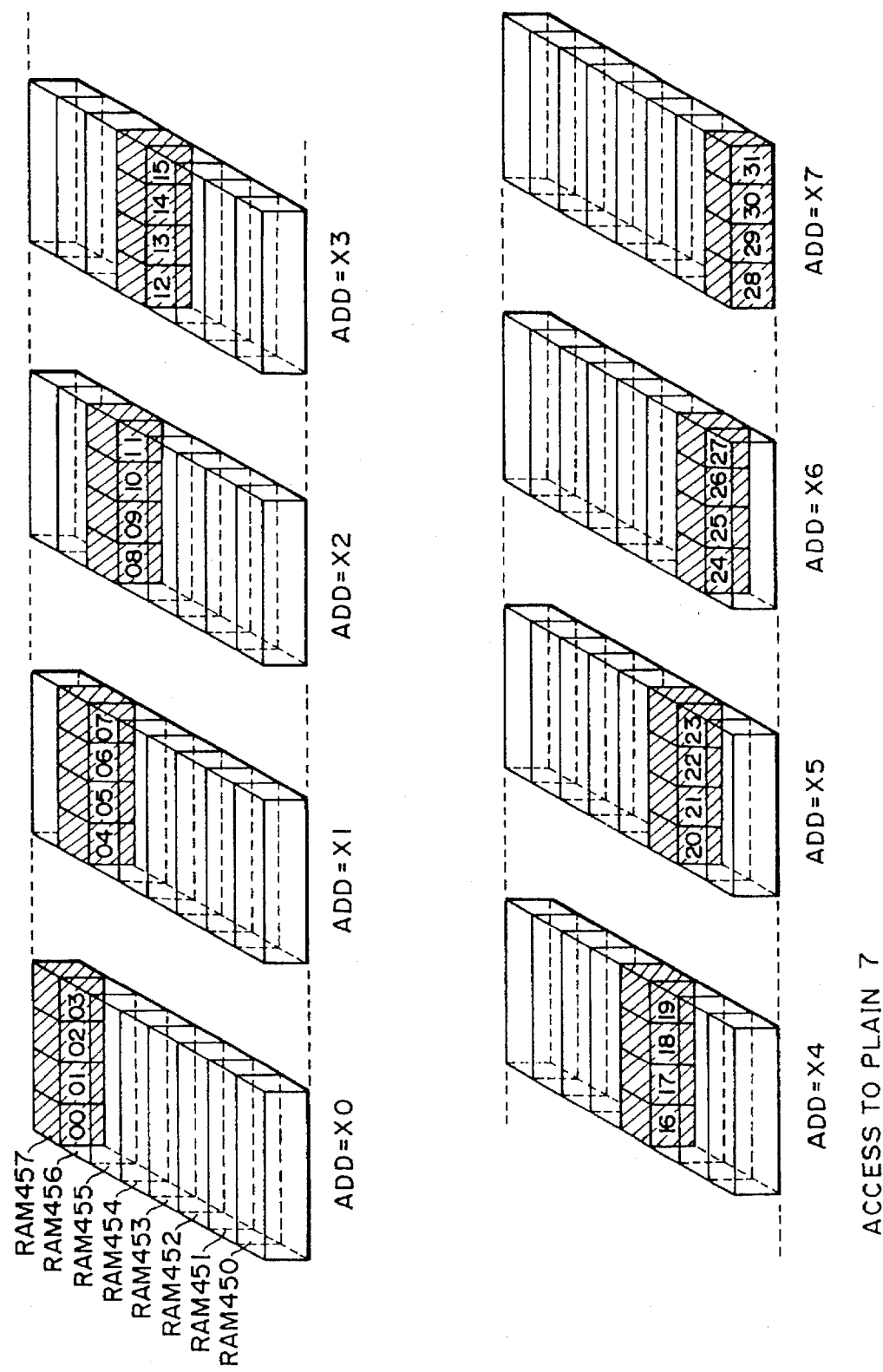
FIG. 15 is a schematic diagram showing the construction of an image data to be written in each RAM.

Next, the address control circuit 400 for controlling the addresses of the RAMs 450 to 457 will be described with reference to FIG. 8. In FIG. 8, the address control circuit 400 includes a register 401 for storing plane numbers to be accessed, and switches 402 to 409 for switching write-in addresses and read-out addresses to the RAMs 450 to 457.

The register 401 is equipped with signal lines 411 to 413 to which signals representing plane numbers from the CPU are supplied on bit-basis, a signal line 414 to which a register set signal from the CPU is supplied, signal lines 481, 483 and 485 which output signals representing plane numbers on bit-basis, and signal lines 482, 484 and 486 which output inversion signals of the signals of the signal lines 481, 483 and 485.

Desired three signal lines of these signal lines 481 to 486 and the high-order bit of the address bus 415 are synthesized and then supplied to each of the switches 402 to 409 as a write-in address to the RAM. In addition, the switches 402 to 409 are supplied with a read-out address from the address bus 416 of a display system. The switching operation of these switches 402 to 409 is carried out in accordance with the instruction of the CPU, and any one of the write-in or read-out addresses is supplied through the address buses 422 to 429 to the RAMs 450 to 457.

The relationship between the plane number stored in the register 401 and the write-in addresses supplied to the RAMs 450 to 457 is shown in FIG. 7.

The addresses as shown in FIG. 7 are supplied to the respective RAMs 450 to 457 for the write-in operation to the plane, and the image data is rearranged in the first rearrangement circuit 430, so that the image data written in the RAMs 450 to 457 every plane is constructed as shown in FIGS. 8 to 15.

Figure 16:
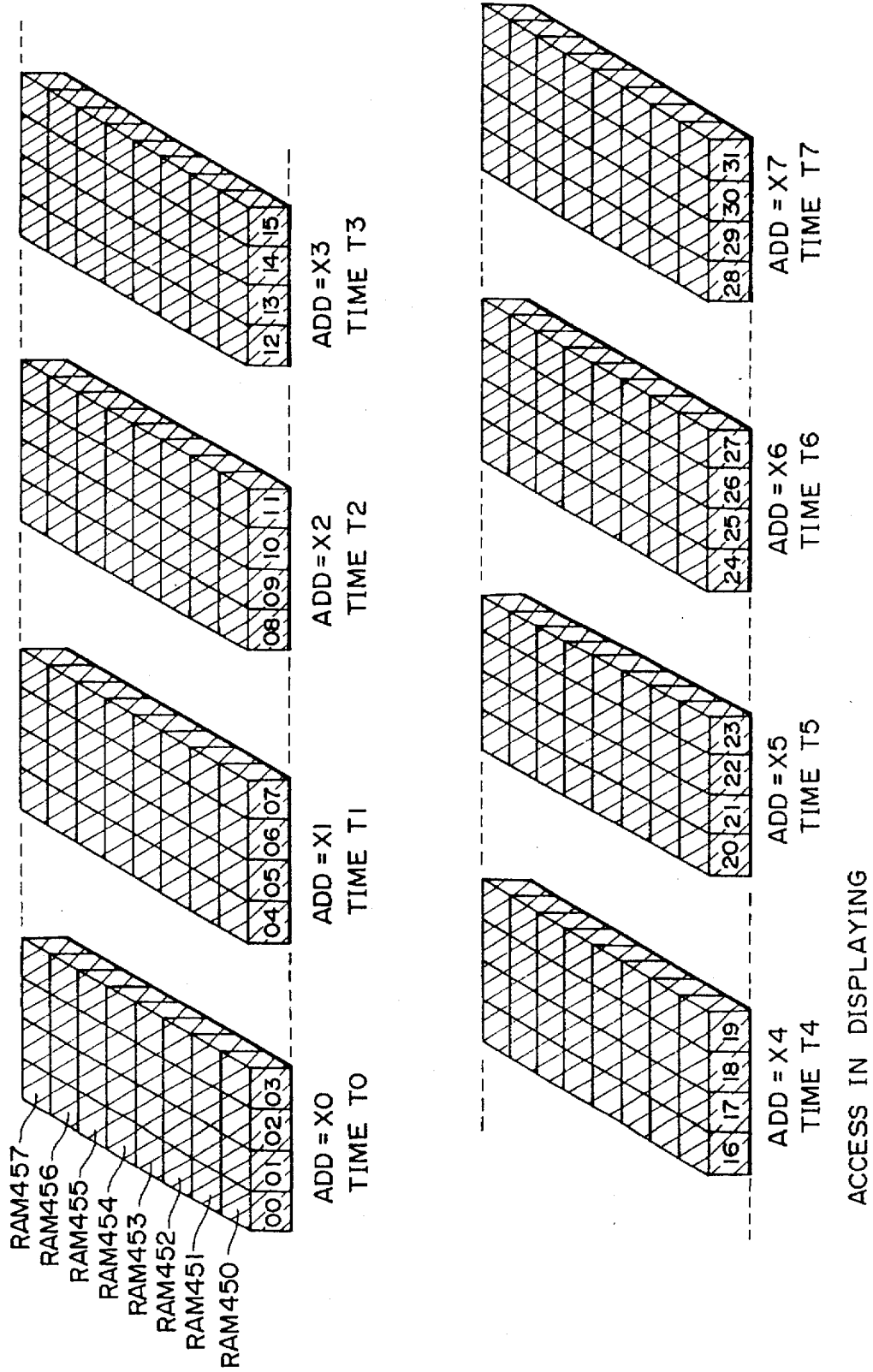
FIG. 16 is a schematic diagram showing the construction of an image data to be read out of each RAM.
Figure 17:
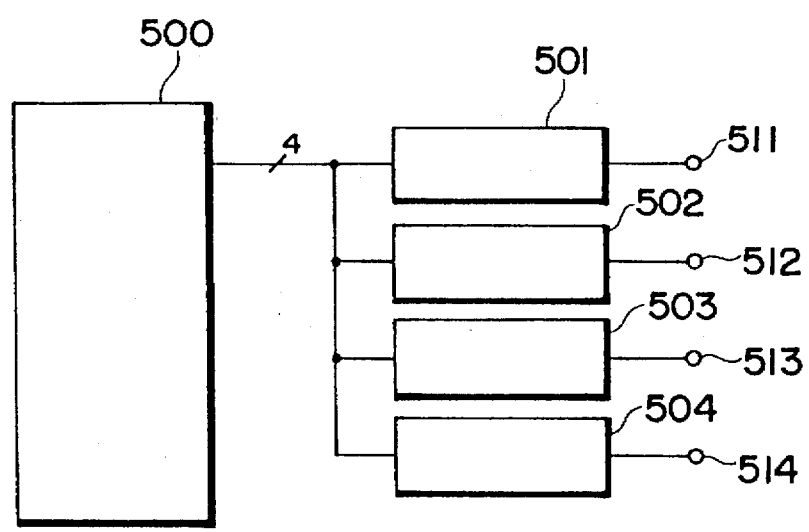
FIG. 17 is a block diagram for a conventional image control device.
Figure 18:
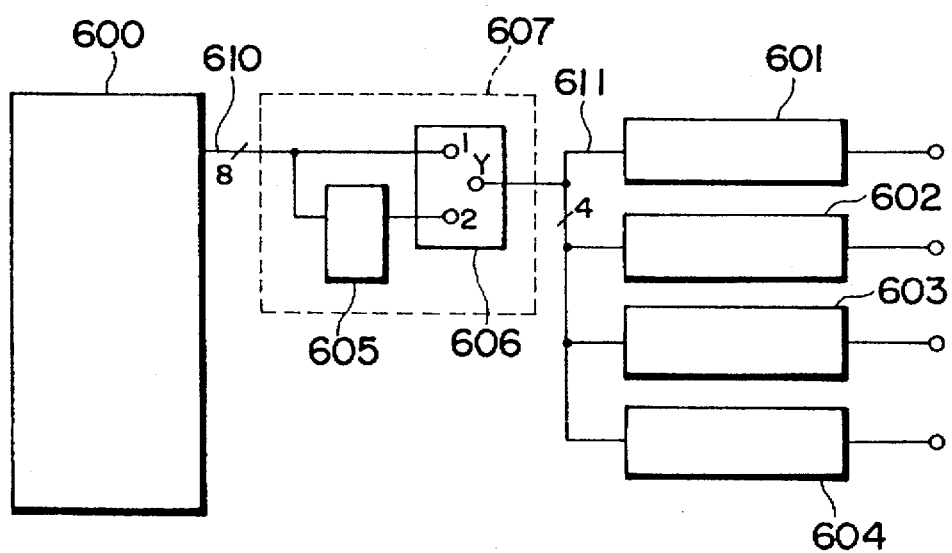
FIG. 18 is a block diagram for a conventional image control device.
Figure 19:
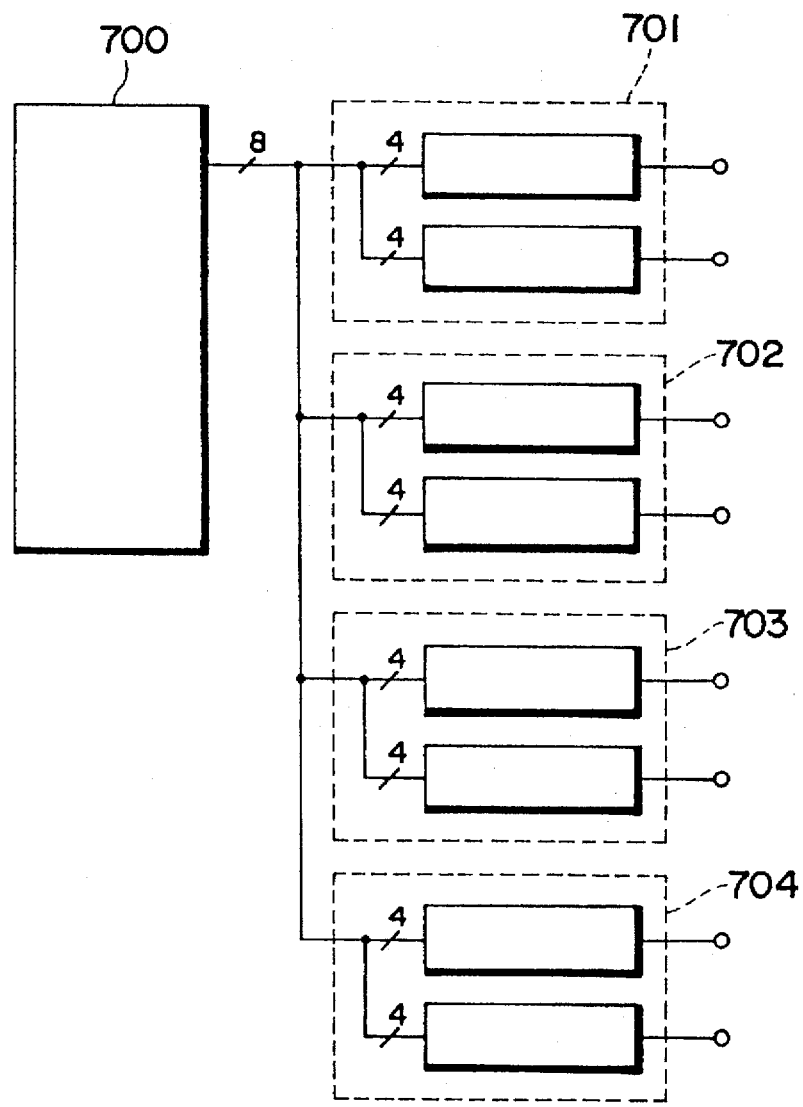
FIG. 19 is a block diagram for a conventional image control device.

In the read-out operation from the plane, the read-out address from the address bus 416 is supplied to each of the RAMs 450 to 457, and the image data is rearranged in the second rearrangement circuit 460, so that the image data supplied to the color table is constructed as shown in FIG. 16.

The same element may be used for the first and second rearrangement circuits. Further, the second rearrangement circuit 460 may be provided between the parallel/serial converter 470 and the color table. Still further, a DRAM or VRAM may be used for the RAMs 450 to 457, and other memory elements may be also used.

UTILITY OF INDUSTRIAL FIELD

As described above, according to the image control device of this invention, the drawing portion can reduce the number of access operations of a memory exclusively used for video which require relatively more time than a main memory, etc., and thus a reduced time can be provided to a data processing time which must be originally carried out by the drawing portion, or another input/output device. Therefore, not only high-speed image drawing can be performed, but also performance of the whole device can be improved. In addition, even when this invention is used in combination with the solving means of the prior art, the total memory capacity and the access speed of the drawing portion are clearly superior over those of a device to which this invention is not applied.

What is claimed is:

1. An image control device having an image drawing unit for handling a number of bits of data and for outputting a plurality of planes, each of the planes corresponding to one frame of information to be displayed, an image storing unit for storing the plurality of planes, and an image display, the image control device further comprising:

(a) a plurality of memory blocks included in the image storing unit, each of the plurality of memory blocks having a capacity capable of storing at least one of the planes in the image storing unit, each of the memory blocks having a data port number, the data port number of each memory block being smaller than the number of bits of data handled in the image drawing unit, (b) a first data bus converting circuit, the first data bus converting circuit having a plurality of input terminals for inputting data units from the image drawing unit in parallel, the data units being divided from at least one of the planes, and a plurality of output terminals for outputting the data units to the memory blocks in parallel, (c) a second data bus converting circuit, the second data bus converting circuit having a plurality of input terminals for inputting the data units from the memory blocks in parallel and a plurality of output terminals for outputting the data units to the display, each of the output terminals of the second data bus converting circuit being allocated to a selected one of the planes in the image storing unit, and (d) an address controller for controlling connections between the input and output terminals of the first data bus converting circuit such that the data units constituting the at least one of the planes to be stored in the image storing unit are respectively stored in the different memory blocks, wherein connections between the input and output terminals of the second data bus converting circuit are controlled such that the data units constituting the selected one of the planes in the image storing unit and stored in the different memory blocks are outputted through the allocated output terminal for the selected one of the planes in the image storing unit of the output terminals of the second bus converting circuit.

2. The image control device of claim 1, wherein there are 4 constitutable planes, the image drawing unit handles data having data having a bit length of 16 bits, and each memory block has 4 data terminals 4.

3. The image control device of claim 1, wherein there are 4 constitutable planes, the image drawing unit handles data having a bit length of 32 bits, and each memory block has 8 data terminals.

4. The image control device of claim 1, wherein there are 8 constitutable planes, the image drawing unit handles data having a bit length of 32 bits, and each memory block has 4 data terminals.

* * * * *

UNITED STATES PATENT AND TRADEMARK OFFICE
CERTIFICATE OF CORRECTION

PATENT NO.  : 5,742,281
DATED       : April 21, 1998
INVENTOR(S) : Katsutoshi Nakamura It is certified that error appears in the above-identified patent and that said Letters Patent is hereby corrected as shown below:

On the title page, Col. 1, in item [63], under Related U.S. Application Data, the parent PCT application should read -- PCT/JP92/00054 --.

Signed and Sealed this

Eleventh Day of August 1998

Attest:

BRUCE LEHMAN

Attesting Officer

Commissioner of Patents and Trademarks